United States Patent
Gravely, Jr.

[11] 3,907,624
[45] Sept. 23, 1975

[54] PANEL WITH DECORATIVE INTEGRAL SHAPED EDGE AND METHOD OF FORMING SAME

[75] Inventor: Richard P. Gravely, Jr., Martinsville, Va.

[73] Assignee: Henry County Plywood Corporation, Ridgeway, Va. ; a part interest

[22] Filed: June 30, 1972

[21] Appl. No.: 268,120

Related U.S. Application Data

[63] Continuation-in-part of Ser. No. 755,914, Aug. 28, 1968, abandoned.

[52] U.S. Cl. .................. 156/214; 52/309; 52/624; 156/221; 156/242; 156/245; 156/267; 264/138; 264/220; 264/259; 264/DIG. 64; 264/DIG. 66; 428/81

[51] Int. Cl.[2] ............ B32B 31/30; B29C 1/14

[58] Field of Search ........ 52/309, 614, 624; 161/44; 264/138, 274–276, 279, 220, 225, 259, 310, DIG. 64, DIG. 66, DIG. 76; 156/214, 299, 220, 221, 242, 244, 267, 245, 196, 228

[56] References Cited
UNITED STATES PATENTS

| | | | |
|---|---|---|---|
| 2,031,900 | 2/1936 | Miller | 181/33 R |
| 2,748,046 | 5/1956 | Works et al. | 156/267 X |
| 2,959,816 | 11/1960 | Valentine et al. | 264/138 |
| 3,223,056 | 12/1965 | Wilburn | 161/44 X |
| 3,293,018 | 12/1966 | Doty | 264/310 X |
| 3,415,709 | 12/1968 | Santangelo | 161/44 |
| 3,458,373 | 7/1969 | Knipp et al. | 156/245 X |
| 3,705,931 | 12/1972 | Confer et al. | 264/274 X |
| 3,846,534 | 11/1974 | Hallinan et al. | 264/279 X |

FOREIGN PATENTS OR APPLICATIONS

| | | |
|---|---|---|
| 49,872 | 8/1939 | France |
| 952,209 | 3/1964 | United Kingdom |

*Primary Examiner*—Harold Ansher
*Attorney, Agent, or Firm*—Clarence A. O'Brien; Harvey B. Jacobson

[57] ABSTRACT

A panel provided with an integral shaped edge that is decorative in nature and cast or molded onto the panel to provide an integral structure. A method of combining the material which forms the decorative integral shaped edge with the panel.

10 Claims, 25 Drawing Figures

US Patent  Sept. 23, 1975  Sheet 1 of 4  3,907,624
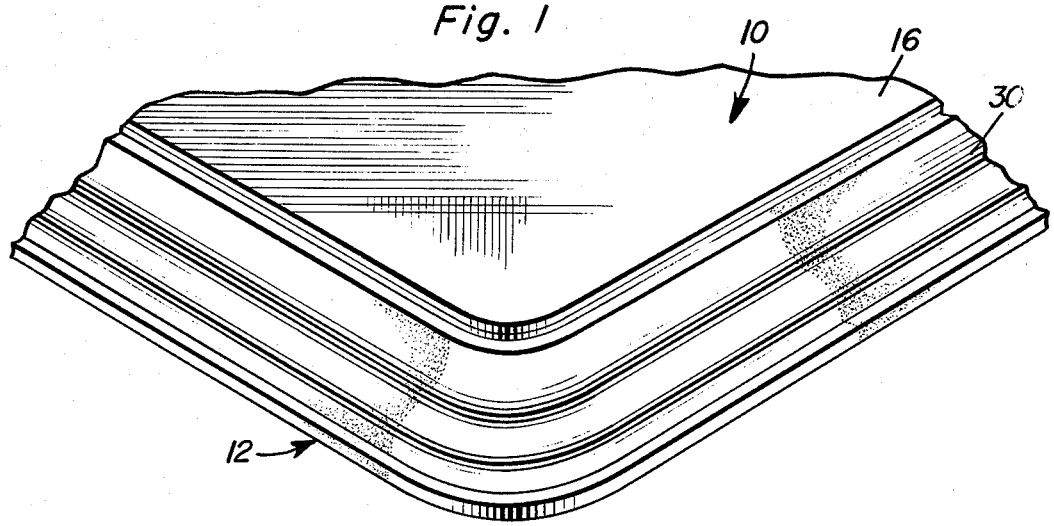
Fig. 1
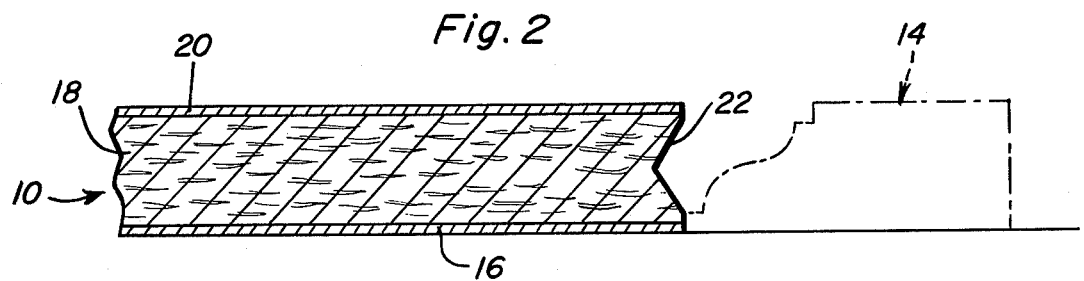
Fig. 2
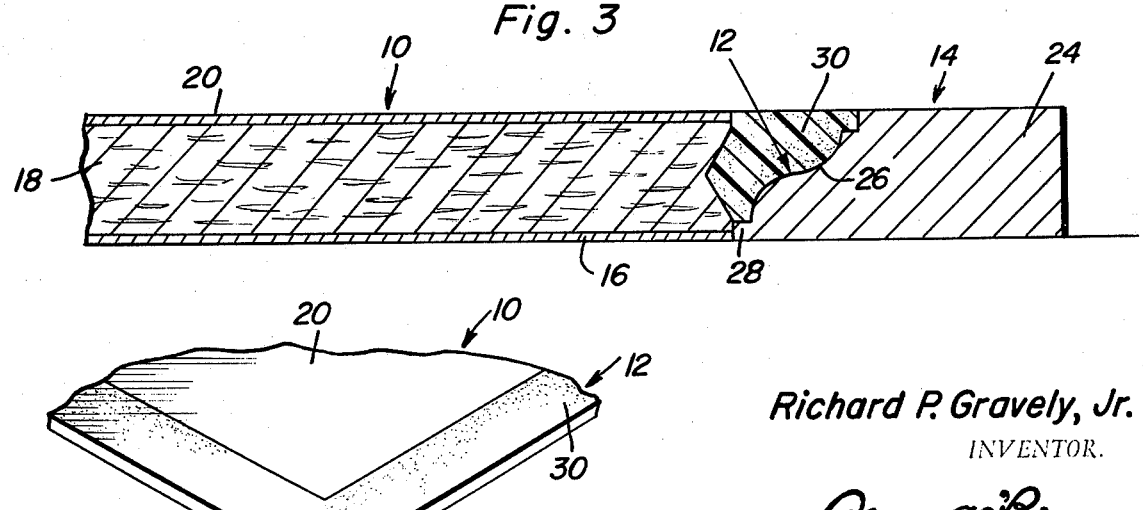
Fig. 3
Fig. 4
Richard P. Gravely, Jr.
INVENTOR.
BY Clarence A. O'Brien
and Harvey B. Jacobson
Attorneys Richard P. Gravely, Jr.
INVENTOR.

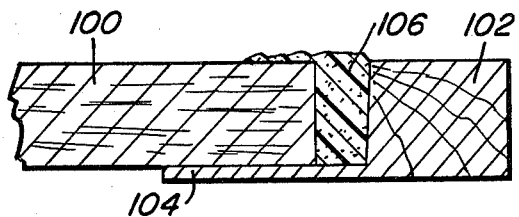
Fig. 9
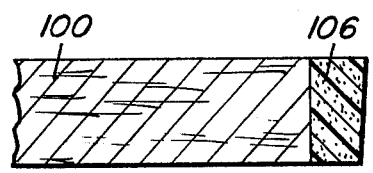
Fig. 10
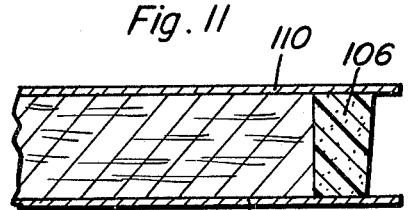
Fig. 11
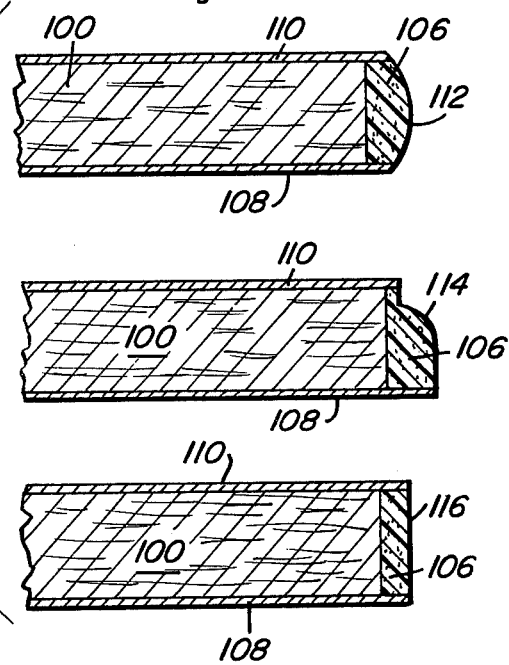
Fig. 12
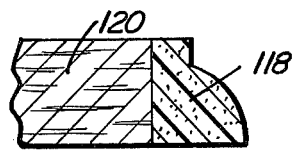
Fig. 13
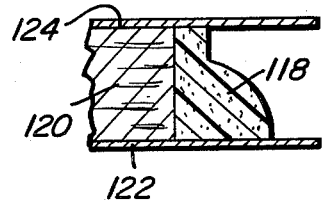
Fig. 14
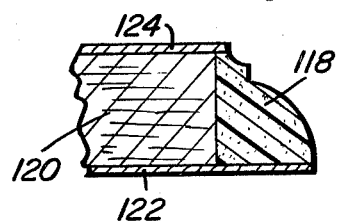
Fig. 15
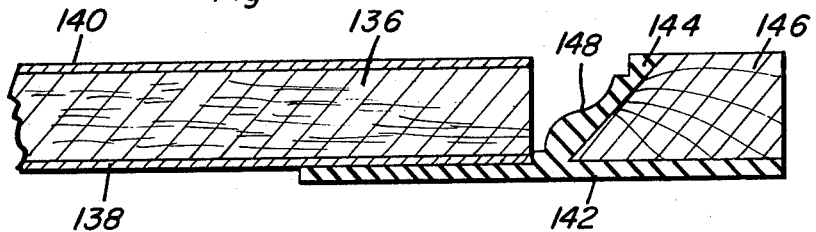
Fig. 16
Fig. 17

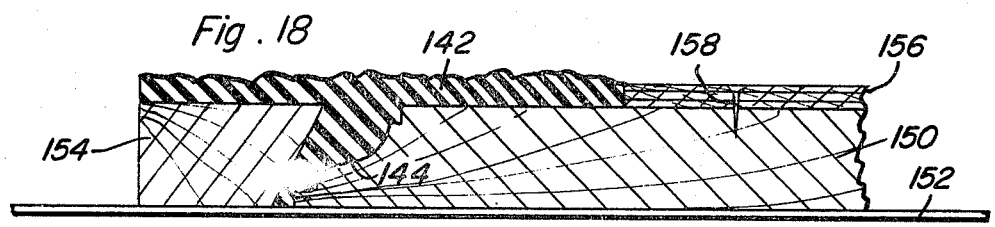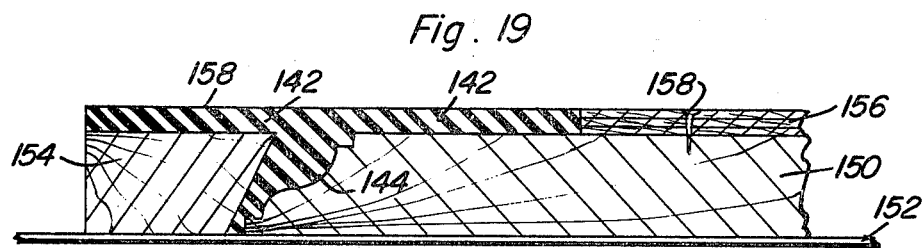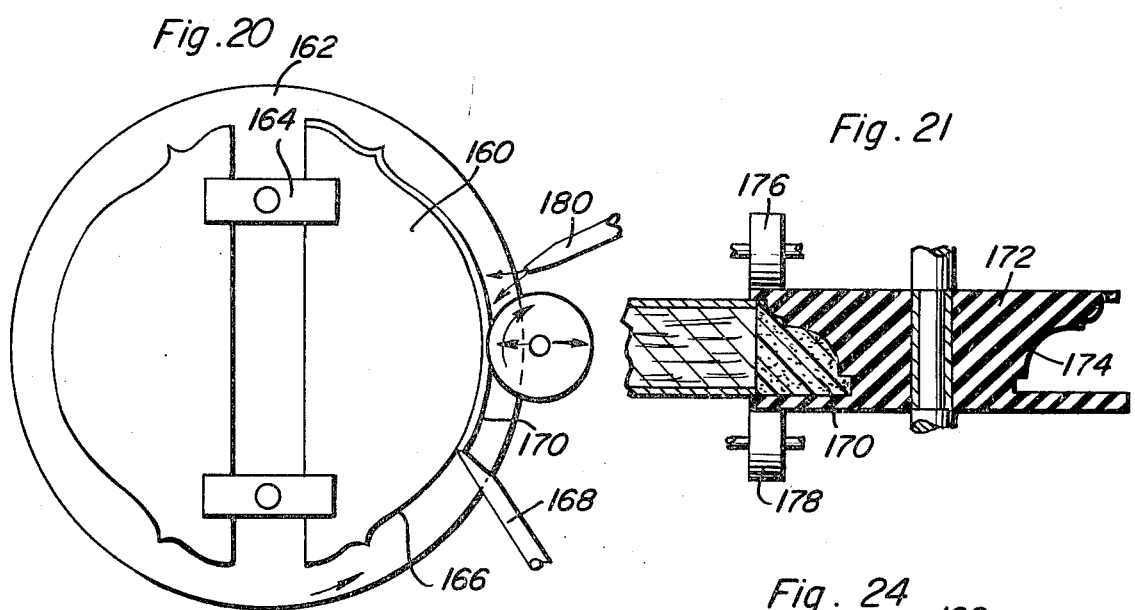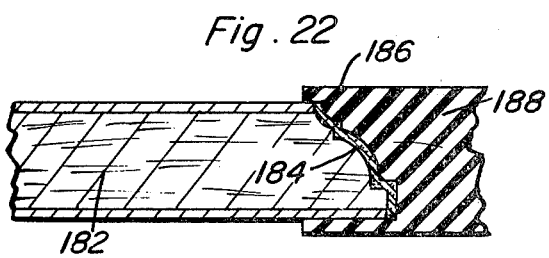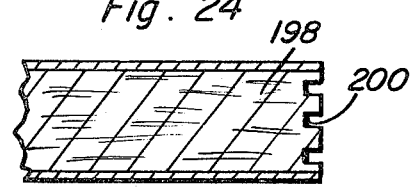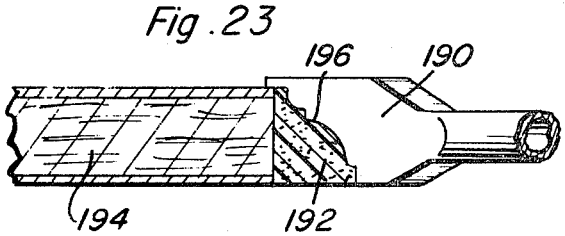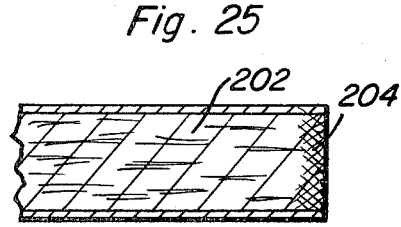

PANEL WITH DECORATIVE INTEGRAL SHAPED EDGE AND METHOD OF FORMING SAME

CROSS REFERENCE TO RELATED APPLICATION

This application is a continuation-in-part of my copending Application Ser. No. 755,914, filed Aug. 28, 1968, for METHOD OF FORMING INTEGRAL DECORATIVE SHAPED SURFACES ON PANELS now abandoned.

BACKGROUND OF THE INVENTION

1. Field of the Invention

The present invention generally relates to panels and, more particularly, rigid panels having a decorative integral shaped edge thereon formed by hardenable material applied to the panel in a castable or moldable condition and allowed to harden, thus providing an integral decorative shaped edge on the panel.

2. Description of the Prior Art

Rigid panels are employed in the construction of various items and frequently, decorative surfaces or edges are applied thereto for enhancing the appearance and functional characteristics of such panels. Various prior developments exist in the provision of decorative surfaces and edges on panels. U.S. Pat. No. 3,223,056, issued Dec. 14, 1965, discloses a table top with veneer sheets bonded to the surfaces thereof with the edges of one or both of the veneer sheets extending beyond the edge of the core of the panel and a cast or molded resin forming an edging for the panel with the projecting veneer sheet or sheets overlying the edging. U.S. Pat. No. 3,415,709, issued Dec. 10, 1968, discloses an edge reinforcement on a panel in which the edging is combined with the panel by employing an injection molding procedure with pressure being required for the thermoplastic material to pass through the score marks and into the fiberous interior of the base sheet or panel. U.S. Pat. No. 2,031,900, issued Feb. 25, 1936, relates to the construction of accoustical wall tile that includes a preformed membrane of metallic foil shaped to conform with a mold with the membrane being shaped to its final form prior to being positioned in a mold. A pad of fiberous material is then placed in the membrane and the space between the periphery of the fiberous pad and the membrane is then filled with a hardenable material to form the finished tile.

While such prior devices are known, they have not been effectively employed for providing panels with a decorative integral shaped edge.

SUMMARY OF THE INVENTION

An object of the present invention is to provide an integral shaped edge or surface of a decorative nature on a panel by employing castable material associated with the panel in order to become integral therewith when the castable material hardens or sets.

Another object of the invention is to provide a process by which relatively inexpensive panels which are highly resistant to delamination, splitting or other failure of the surface veneers, but which are of materials whose edges are not suitable for many uses may be provided with an integral shaped edge by employing castable material including but not limited to filled polyesters, expanded polystyrene, expanded polyurethane, water extendible polymers, and similar materials.

A further object of the invention is to provide a process for combining a decorative shaped surface with a panel employing a castable material defining the decorative shaped surface which may be associated with a panel in various relationships, such as by covering the entire top and bottom surface of the panel and terminating inwardly of or projecting beyond the peripheral edge of the panel, extending completely about the periphery of the panel and extending above or below the top and bottom surfaces thereof and terminating inwardly in offset relation to the top and bottom surfaces thereof or any combination of a panel and decorative shaped surface desired for particular structural units or the like.

Still another object of the present invention is to provide a process for applying a decorative shaped edge to a panel by employing a continuous method by moving a preformed panel past an extruder, preferably having a shaped nozzle or opening which would roughly conform the extruded plastic material to a desired final profile in order to reduce the amount of material to be compressed and moved by an embossing surface, such as a roller or the like.

A still further object of the present invention is to provide a process in which the edging is first applied to a substrate, then applying a face and a back to form a three-ply panel and finally profiling the edge by a shaping operation. As a variation, profiled and textured surfaces can be obtained over most of the exposed edges by applying a profiled and grained edge to the core with excess polyester provided at the top of the shape and at the bottom, if necessary, which is partially cut away when the panel is trimmed and sized.

Yet another important object of the invention is to provide a process of providing a decorative integral shaped edge on a panel in which a seal is provided between the mold and the panel to prevent seepage under the panel with the seal underlying the mold as well as the panel or as an alternative being formed as an integral portion of the mold.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmental perspective view illustrating a panel having a decorative shaped edge surface formed integral therewith by employing the method of the present invention.

FIG. 2 is a sectional view of a portion of the panel prior to forming the decorative shaped edge thereon with the mold structure illustrated in broken line.

FIG. 3 is a sectional view similar to FIG. 2 illustrating the mold in position with the decorative shaped edge surface for the panel formed by a castable material received in the mold and keyed to the panel.

FIG. 4 is a fragmental perspective view of the item of FIG. 1 but illustrating it in inverted position as compared with FIG. 1.

FIG. 9 is a fragmental sectional view illustrating a technique in which the polyester edge is slightly tapered or beveled and is formed on a preformed core or substrate in which the edge is relatively narrow.

FIG. 10 is a sectional view of the panel of FIG. 9 removed from the mold with the edge thereon.

FIG. 11 is a view similar to FIG. 10 but illustrating a laminated veneer sheet on the top and bottom surfaces of the panel.

FIG. 12 is a group view illustrating typical edge profiles obtainable by shaping and at the same time removing excess face and back material which projects beyond the edge of the castable material.

FIG. 13 illustrates a profiled edge formed on a panel.

FIG. 14 illustrates the profiled edge of FIG. 13 with a face and back attached thereto.

FIG. 15 is a sectional view of the completed profiled edge formed by shaping the panel of FIG. 14.

FIG. 16 shows a mold an panel assembly with a seal strip underlying both the mold and panel to prevent seepage of the castable material under the panel.

FIG. 17 is a sectional view illustrating a mold and panel with seal integral with the mold and including a liner for the decorative surface thereof.

FIG. 18 illustrates the procedure in forming the mold liner and seal of FIG. 17.

FIG. 19 is a sectional view illustrating the final step in the technique of forming the mold liner and seal of FIG. 17.

FIG. 20 is a schematic plan view illustrating a continuous process of applying hardenable material to an edge of a panel by moving the panel past an applicator, a shaping device and a drier.

FIG. 21 is a sectional view of the assembly of FIG. 20.

FIG. 22 is a sectional view illustrating the preformed panel having a shaped edge to enable a relatively thin body of castable material to be placed thereon.

FIG. 23 is a sectional view illustrating the use of a shaped nozzle to preshape the castable material prior to it being final shaped by a die.

FIG. 24 is a sectional view illustrating grooves formed in the edge of the panel to provide a key for anchoring the edge material.

FIG. 25 is a sectional view illustrating an adhesive applied on or partially penetrating the edge of the panel preformed for anchoring the edge material.

DESCRIPTION OF THE PREFERRED EMBODIMENTS

Figure 5:
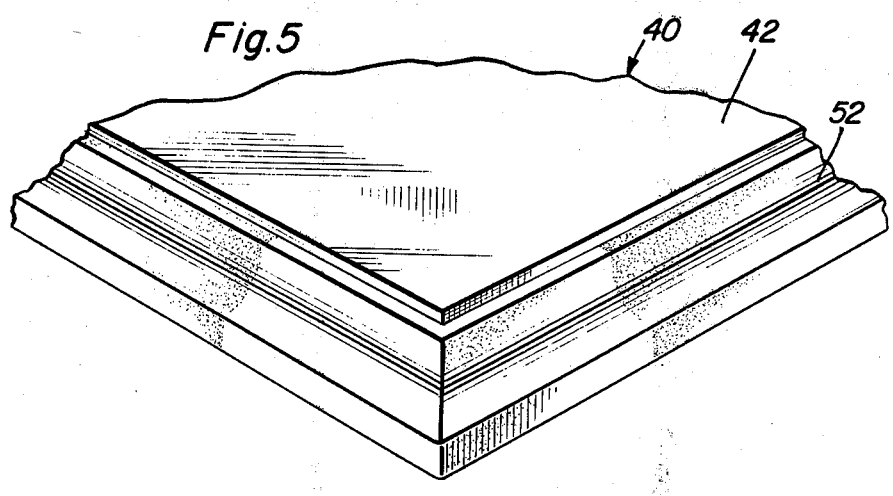
FIG. 5 is a perspective view of the corner of another panel formed by employing the method of the present invention.

Referring now specifically to FIGS. 1–4, a panel, generally designated by the numeral 10 is provided with a decorative shaped surface, in this instance, an edge surface generally designated by the numeral 12 by employing a mold generally designated by the numeral 14 by employing the procedural steps of the present invention.

The panel 10 includes a decorative face veneer 16, a core 18 of inexpensive material such as particle board or the like and a back veneer 20. The peripheral edge of the panel 10 is provided with inwardly inclined surfaces 22 generally defining a shallow V-shaped notch to form a key for retaining the decorative shaped edge 12.

The mold 14 includes a peripheral member 24 encircling the edge of the panel 10 with the member 24 having a thickness equal to the thickness of the panel 10 with the inner edge thereof being provided with a desired shaped configuration 26 which may be in the form of any desired curved, angulated or other shaped configuration. The lower end of the edge 26 includes a projection 28 which engages the edge of the panel 10 which, in effect, offsets the shaped edge 12 down from the face veneer 16.

The decorative shaped edge 12 includes castable material 30 which completely fills the cavity between the inner edge 26 of the peripheral mold member 24 and the peripheral edge of the panel 10 as illustrated in FIG. 3. The panel 10 and the mold 14 will be supported on a suitable flat surface and the surface of the castable material 30 will be flush with the corresponding surfaces of the panel 10 and the mold 14. After the castable material has cured or hardened, the mold 14 is separated from the panel 10 and hardened shaped edge 12 attached thereto thus leaving the finished panel as illustrated in FIGS. 1 and 4 which may be employed for various purposes including use as a panel in the furniture industry. For example, the structure illustrated in FIGS. 1 and 4 may be employed as a table top or a top for any other item of furniture in which the decorative shaped edge 12 is integral and permanently connected with the periphery of the panel 10.

Figure 6:
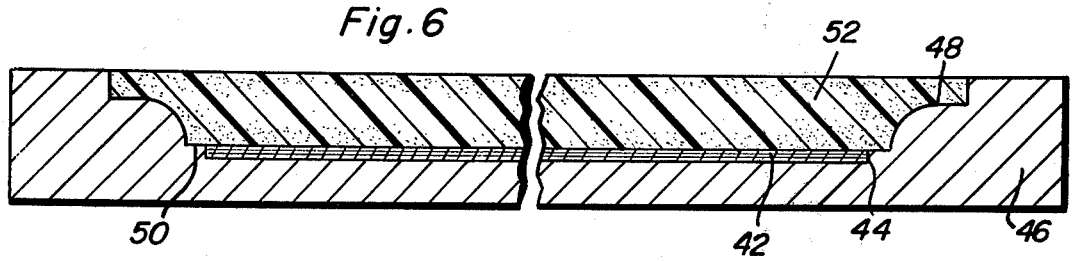
FIG. 6 is a sectional view illustrating the mold, the panel and the decorative shaped surface of castable material associated with the panel and mold illustrating how the completed panel of FIG. 5 is formed.

FIGS. 5 and 6 disclose a panel assembly 40 which includes a thin panel of decorative veneer 42 which is placed within a cavity 44 in a mold 46 which has a decoratively shaped interior edge 48 defining the portion of the cavity above the recess 44 therein. The bottom of the cavity in the mold is designated by the numeral 50 and the recess 44 occupies substantially all of the bottom surface 50 of the cavity with the shaped interior edge 48 defining the periphery of the cavity in the mold 46. After the panel 42 which is a thin decorative veneer is placed in the recess 44 in the bottom of the cavity in the mold 46, the remainder of the cavity is filled with a castable material 52 which forms the decorative shaped surface for the panel 42 when the castable material 52 hardens. After the castable material 52 hardens, the mold 46 will be removed therefrom in the usual manner and the completed panel assembly 40 is formed and may be employed for various purposes.

Figure 7:
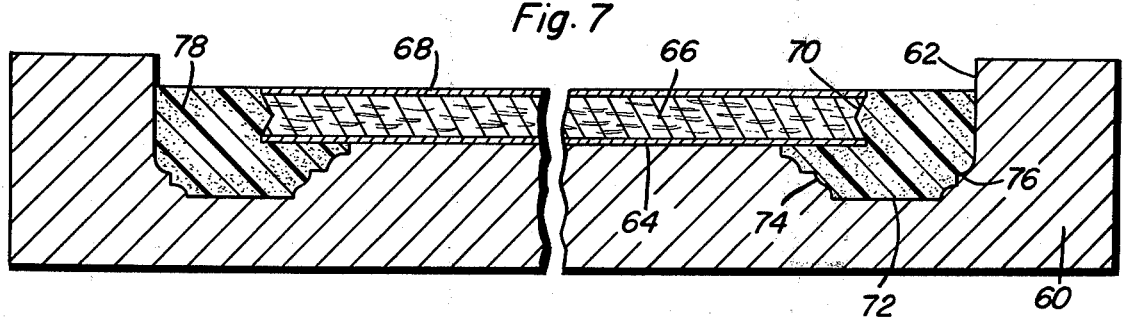
FIG. 7 is a sectional view of a mold, panel and decorative shaped surface associated therewith illustrating the manner of forming another type of decorative shaped surface on a panel.

FIG. 7 illustrates a mold 60 having a cavity 62 therein which includes a bottom surface 64 receiving a panel 66 which may be similar to the panel illustrated in FIGS. 1–4 and which includes a facing veneer 68 on one or both surfaces thereof and a notched peripheral edge 70. The bottom surface 64 of the cavity 62 of the mold 60 is provided with a peripheral recess 72 having shaped decorative inner and outer peripheral corner portions 74 and 76 which join with the bottom surface 64 and the peripheral interior surface of the cavity 62 as illustrated in FIG. 7 for receiving castable material 78 which fills the recess 72 and conforms in configuration to the surfaces 74 and 76. The castable substance 78 is flush with the upper surface of the panel 66 when it rests upon the bottom surface 64 of the cavity 62 of the mold 60 thereby defining a decorative shaped surface or edge integral with the panel 66 which will project above one of the surfaces of the panel 66 to define a peripheral edge having decorative surface configurations thereon.

Figure 8:
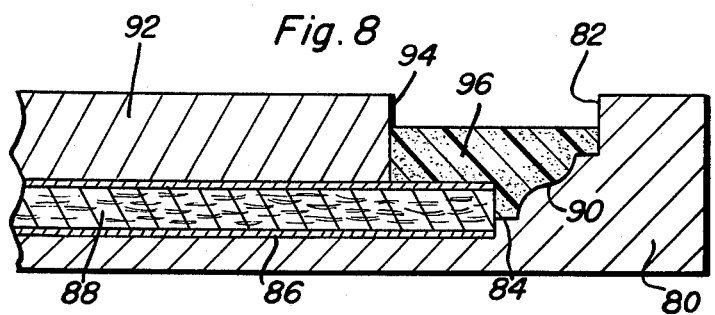
FIG. 8 is a partial sectional view of a mold, panel and castable decorative shaped edge surface together with an inner mold associated therewith illustrating the manner of forming a panel with another type of decorative shaped surface.

FIG. 8 illlustrates another embodiment of the invention in which the mold 80 includes a cavity 82 provided with a bottom surface 84 having a recess 86 therein receiving a panel 88 within the recess with a portion of the peripheral edge of the panel projecting above the bottom surface 84 into the cavity 82. The interior bottom corner of the cavity 82 is provided with a peripheral decorative edge forming surface 90 and an inner mold member 92 engages the panel 88 and is provided with a peripheral surface 94 spaced inwardly of the peripheral edge of the panel 88 to combine with the cavity 82, the surface 90 and the bottom 84 to define a space for receiving a castable material 96 to define a decorative shaped edge for the panel 88 which is offset slightly from one surface of the panel 88 but covers the remainder of the edge thereof and extends overtop of a portion of one surface of the panel 88.

It is pointed out that the embodiments of the invention disclosed herein are representative only in that the shape of the mold and the panel received therein together with the shapes, sizes and configurations of the recesses and shaped surfaces in the mold may be varied in order to provide a desired decorative shaped surface on the panel.

By employing this method or procedure, a decorative shaped surface or edging of a suitable castable material is effectively applied to a panel of relatively inexpensive material which cannot be satisfactorily machined by conventional methods to produce the desired effect thus eliminating the necessity of using expensive materials which can be machined to produce the decorative shaped surface or edge desired thus reducing substantially the cost of a finished product by reducing the labor required while at the same time producing a continuous one-piece decorative shaped surface or edge securely bonded to the panel without an objectionable joint line created when a flexible shaped molding is wrapped about and secured to a panel. The decorative shaped surface or edge may cover part or all of the surface to which it is applied and it may project beyond one or more edges of such a surface and extend to cover part or all of one or more surfaces adjoining that to which it is applied.

One of the main applications of this process, although not limited thereto, is the production of round, oval or irregularly shaped wood veneer surfaced plywood furniture panels requiring shaped decorative edges. Prior to development of this invention, such panels required a multi-layered laminated construction utilizing wood veneer in combination with a heavy center core of glued solid lumber or of several sheets of wood oriented at right angles to each other to produce maximum strength and stability and to reduce the tendency for the layers, particularly thin surface veneers of decorative cabinet woods, to "check" on split from the tensions caused by expansion or contraction across the direction of the wood grain resulting from normal changes in moisture content of the plywood panel at different seasons or in different areas of the world. Additionally, such thin surface veneers or "faces", if cut and rejoined to produce designs such as diamonds, reverse diamonds, sunbursts, parquets, and border designs, or if containing fragile veneers such as burls or crotches which have an extreme tendency to check or split, must first be laminated in a separate operation to a backing sheet and the resulting two ply construction used as a face in producing the plywood panel. The completed plywood panel must then be further processed to produce the desired decorative shaped edge by sawing to form, cutting away part of the exposed wood edge by a shaping operation and carefully sanding the shaped edge first by machine and then by hand to permit the subsequent application of finishing materials such as stains, fillers, sealers, glazes, lacquers or varnishes and polishes. The materials required for these conventional plywood constructions are in short supply and relatively expensive with the edging and finishing also being quite costly.

The present method permits the use of readily available and much less expensive base materials for panel construction, such as soft-woods, soft-wood plywood, hard-boards and particle-board or flake-board, to which the decorative face veneers are added. In many cases, these materials allow the reduction of the number of layers and in addition, the use of hardboards, particle-board or flake-board cores which have a greatly reduced tendency to expand or contract in any given direction with changes in moisture content will thus permit the use of burl veneers or matched designs of thin veneers as faces without the necessity for first laminating such faces to a backing sheet thereby substantially reducing the process time, the loss through rejects and the material and labor costs. Further, the present method eliminates the slow and expensive operations of machining and sanding the exposed wood or veneer edge and the subsequent finishing processes are greatly simplified and reduced in cost.

In practicing the process, a plywood panel is produced using the inexpensive materials and constructions described above and this panel is formed to a desired shape by sawing or any other procedure desired. If maximum resistance to separation of the decorative shaped surface or edge is desired, the exposed edge of the panel is provided with the shallow notch or key into which the castable substance will harden. The panel with either a plain edge or keyed edge is placed in the proper position in the mold which has the desired profile on its inner surface and the castable substance is added to fill the void between the edges of the panel and the mold. Then when the castable substance has hardened, the panel with the decorative integral shaped surface or edge in position is removed from the mold and is ready for use.

The mold may be constructed from a rigid substance such as wood, metal or plastic and may be cast from a substance which becomes rigid when set. It may be molded from a flexible substance such as silicon rubber to facilitate the de-molding of complicated shapings. Further, the inner surface of the mold may be polished to produce a desired smooth surface on the decorative shaped surface or edge or it may be textured to reproduce the grain pattern of wood or wood veneers. If textured, inks or stains may be applied to the textured surface prior to each casting to further accentuate the desired appearance of the wood grain pattern on the molded edge. Also, the mold may be constructed to permit the introduction of one or more suitably shaped pieces of veneer facing, plywood or other material into corresponding recesses in the mold after which the castable substance is added bonding all of the components together into a single assembly as illustrated in FIG. 6.

FIG. 9 illustrates a technique in which the core, substrate or panel 100 is not necessarily precisely formed and may be rough bandsawn in a stack or in multiples of 6 or 8 members and the core 100 does not require precise positioning in the mold 102 which includes an inwardly extending peripheral flange 104 disposed in underlying supporting relation to the core 100. The castable material 106 is relatively narrow or thin, thus conserving material and reducing the cost of the material. As illustrated, where the castable material 106 is relatively narrow, a slightly beveled or tapered, but otherwise square or smooth surface may be provided on the mold 102 with the bevel or taper aiding in removing the finished panel from the mold and providing a slightly wider area for facilitating placement of the polyester between the core and the mold 102. The excess polyester may be removed from the assembly illustrated in FIG. 10 by sanding or the like, after which a face 108 of high pressure laminate, plastic or other material is applied thereto and, alternatively, a back 110 may also be applied thereto with the peripheral edges of the face 108 and back 110 projecting beyond the polyester edge 106 with the edges given a profile by conventional shaping methods. FIG. 12 illustrates typical profile surfaces 112, 114 and 116 on the edge 106 with this profiling being done by a conventional shaping operation which at the same time removes excess face and back material that projects beyond the edge of the castable material. The resulting profiled edge may be finished by sanding and buffing, if the castable material has been given the proper color, or by sanding and application of a suitable wipe-on stain-lacquer material.

Various shapes of cores 100 may be easily processed by this technique and the narrow margin, approximately 1/16 to 1/8 inch, of castable material which normally appears around the perimeter of panels made by the techniques illustrated in the previous Figures of the drawings does not appear when this technique is practiced. This is of advantage in processing panels with surfaces of plastic materials, such as vinyl film, printed polyester sheets, or printed high pressure melamine laminates, where conventional methods of finishing the edges are apt to cause staining or deposits of overspray on the flat surface, which are removed only with difficulty.

FIGS. 13–15 illustrate a technique employed when grain detail is required on the finished edge. In this arrangement, a profiled edge 118 is applied to the panel 120 in which the profiled and grained edge is provided with excess polyester and the assembled edge and core is then provided with a face 122 and a back 124 both of which extend peripherally beyond the edge 118. The assembly is then shaped by employing a shaping device which trims and sizes the edge 118 to its final shape and at the same time trims the face and back with the final construction illustrated in FIG. 15. This technique results in a fully detailed edge except for the thickness of the face and the back 122 and 124 at the top and bottom edges of the panel. Because of the grained surface, this type of edge should be finished both to bring out the grain detail and to produce the proper surface. While high pressure laminate faces and backs are disclosed in the techniques in FIGS. 9–15, wood veneers could also be used. Various types of glues may be employed, such as polyvinyl glue or equivalents which provide a good bond with the polyester edge.

FIG. 16 illustrates a technique in which seepage of polyester or castable material under the panel is prevented with the core being designated by numeral 126 provided with a face 128 and a back 130 and oriented in relation to the mold 132 in the same relationship as in FIGS. 2 and 3, respectively. The castable material will sometimes seep between the mold and the core and also seep between the core and the surface on which it is resting and, of course, harden thereby requiring that it be removed. This is wasteful of material, renders the panel more difficult to remove from the mold, requires considerable additional labor to clean up the mold in preparation for processing the next panel and to remove the excess from the face of the processed panel and in some instances can produce stains on the processed panel which are difficult to remove or subsequently finish.

In order to eliminate this possibility, a strip of flexible resilient material 134 is disposed beneath the mold 132 and the core 126 with the strip 134 bridging the juncture between the mold 132 and the core 126 thereby forming a bottom or lower surface for the cavity into which the castable material is poured. The resilient layer or seal 134 may be separate from the mold 132 or it may be a part thereof or secured thereto. When the seal 134 is separate from the mold as illustrated in FIG. 16, the seal is placed on a rigid platform and the mold 132 placed in proper position over it and clamped, bolted, or otherwise secured to form a tight joint into which the castable material cannot flow or seep. The panel 126 is then placed in the mold in proper position on the seal 134 and is clamped down to form a tight joint to exclude the castable material from the face of the panel 126.

FIG. 17 illustrates an assembly similar to FIG. 16 in which the seal is a part of the mold itself. In this assembly, the core or panel is designated by numeral 136 and provided with a face 138 and a back 140 which is clamped against a seal strip 142 that is substantially the same as the seal strip 134 in FIG. 16 except that it includes an integral liner 144 extending upwardly therefrom in engagement with the inner surface of the mold 146 and provided with a decorative shaped surface 148 which together with the edge of the panel 136 defines the cavity for the castable material. Thus, the exposed surface of the seal may be grained or textured to match the interior of the mold, if desired, and since the seal and mold are integral and no possibility of seepage exists, only the panel 136 need to be clamped in position after assembly in the mold having the seal and liner associated therewith.

FIGS. 18 and 19 illustrate the technique of forming the seal and liner illustrated in FIG. 17 and includes a pattern or model 150 of the desired finished shaped configuration of the core with the integral shaped edge thereon which is positioned on a supporting surface 152 interiorly of a mold frame 154 which may be the same mold frame as illustrated in FIG. 17 thus defining a cavity between the pattern or model 150 and the mold frame 154. A thin panel 156 is attached to the face of the pattern or model 150 by suitable fasteners 158 thus defining an inner limit for the seal strip 142 which has the thickness desired for the seal with its size and shape being such that a uniform margin is left between the edge of the thin panel 156 and the edge of the face of the pattern or model 150. The frame 154 is oriented in such a way that the thickness of the frame corresponds to the desired thickness of the completed mold and the shape of the frame 154 will produce a uniform cavity about the pattern or model 150 when it is placed therein. The frame is placed on a sheet of material 152 to which the mold material will not adhere and the model 150, after being covered with a mold release material, such as petroleum jelly, is placed face-up on the sheet of material 152 in proper position within the frame 154. The mold material is then poured into the cavity surrounding the model 150 and over its face surface up to the edge of the attached thin panel 156 and allowed to harden, adhering to the inner surface of the mold frame 154 in the process.

Since any irregularities on the bottom surface of the flexible seal 142 would distort the inner surface thereof during use and produce objectionable irregularities in the hardened surface of the castable material, it is an essential step in the process to sand or otherwise smooth the exposed surface 159 of the mold material before removing the completed mold from about the model or pattern 150.

The mold lining and seal may be made of a silicone rubber, urethane elastomer, or similar material. These materials being relatively soft and flexible have the disadvantage of rapid wear and deterioration but the same general classes of materials may be obtained in very hard and rigid form which produces very long mold life but fail to give the desired sealing action to prevent seepage of the castable material. The advantages of both types of materials may be obtained when using the mold with the seal and liner thereon as illustrated in FIG. 17 with the technique of making the same illustrated in FIGS. 18 and 19 by first filling the cavity between the mold frame 154 and the model 150 with the hard version of the mold material and before it hardens and sets, immediately filling the remaining seal and mold cavity with a compatible flexible and resilient version of the mold material, allowing the two materials to blend and knit together and harden into a mold lining and seal which would be hard and resistant to wear within the mold and flexible and resilient in the seal area.

FIGS. 20 and 21 illustrate a technique of applying a hardenable material to the edge of a preformed panel, core, frame, or the like, in a continuous process in which the panel with the hardenable material applied to the edge is moved past a shaping die or surface so that the hardenable material will be formed to any desired profile with the drying or curing of the applied hardenable material being accelerated by application of heat or the like.

As illustrated in FIG. 20, a preformed panel 160 is attached to a supporting surface 162 in any suitable manner such as by clamps or holddowns 164. The supporting surface 162 is in the form of a turntable or other movable support. The edge of the preformed panel 160 may be shaped or preformed in any desired configuration with the edge being designated by numeral 166. As the preformed panel 160 moves, the edge 166 thereof moves past an applicator 168 in the form of a nozzle or extruder which forces the hardenable material 170 by force or pressure onto the edge 166 of the panel 160. The hardenable material 170 is then moved past a rotating profiling die 172 having a peripheral groove 174 therein shaped in accordance with the desired finished profile on the hardenable material 170 which forms the integral shaped edge on the panel 160. The rotating profiling die 172 may be driven in any suitable manner and is preferably spring biased toward the edging 166 and the panel 160 to enable it to move in and out to follow the contour of the edge 166 of the panel 160. The die or molding surface is constructed of a resilient material, such as silicone rubber, or the like, and the top and bottom edges of the groove or cavity 174 therein overlap the corresponding surfaces of the panel 160 with pressure rollers 176 and 178 engaging the external surfaces of the die to seal the die in relation to the panel 160 to prevent seepage of the hardenable material onto the surfaces of the panel. The shaped and profiled edge is then moved past a drying station, such as a hot air jet 180, which accelerates the hardening of the hardenable material defining the edge.

FIG. 22 illustrates substantially the same arrangement except that the panel designated at 182 is provided with a preformed profiled edge 184 so that only a relatively thin layer of hardenable material 186 need be applied to the edge of the panel. By preforming the edge 184 of the panel 182 prior to the application of the hardenable material 186, the thickness of the applied hardenable material is substantially reduced since only a thin layer sufficient to conceal the substrate and receive and retain the impression of the die is necessary thereby reducing the amount of material required and also accelerating the drying, hardening and curing of the applied hardenable material. The die 188 employed in this technique is the same as the die illustrated in FIGS. 21 and 20.

FIG. 23 illustrates an arrangement similar to that illustrated in FIGS. 20 and 21 except that the applicator designated by numeral 190 which applies the hardenable edging material 192 to the panel 194 is provided with a shaped or profiled edge 196 to preform or preshape the hardenable edging material 192 prior to its being engaged by the die. This shaped edging or opening 196 on the applicator or extruder would roughly conform to the final profile so as to reduce the amount of material to be compressed and moved by the rotating die 172.

FIG. 24 illustrates the edge of a preformed core or panel 198 being provided with a plurality of spaced grooves 200 therein which may be in the form of depressions into which the hardenable substance is forced to form a strong and durable joint or bond with the hardenable material.

FIG. 25 illustrates a similar preformed core, panel, or the like 202 in which the edge thereof is provided with an adhesive 204 of various types or fast setting formulations which may be applied to the panel 202 to improve the strength of the bond between the edge of the panel and the applied hardenable substance.

The particular apparatus for supporting and moving the panel in FIGS. 20–25 may be varied with the essential factor being movement of the edge of the panel past the extruder as the plastic is applied. The material being applied may be a thermosetting, thermoplastic, castable or other hardenable material and the rotating die or shaping surface is made in any desired profile and the shaping surface thereof may be smooth, polished, patterned with wood grain, carving, or otherwise formed as a decorative surface. As the preform or panel is moved past the die or as the die is moved past the panel, the profile and the decorative surface patterning if provided on the die is transferred to the applied hardenable substance before it hardens thereby providing a permanent protective and decorative edge treatment. The drying or curing of the applied hardenable substance may be accelerated by preheating the edge of the preform or by application of heat during and/or immediately subsequent to the shaping operation which may be accomplished by various well known heating means and the die itself may be heated if desired. Various shaping operations may be provided on the moving edge or various other operations, such as the polishing, buffing or the like, may be performed on the moving edge immediately subsequent to the application and shaping, embossing and hardening of the applied material either for decorative effect or joinery. Various stains, lacquers, and other decorative or protective material may be applied to the moving edge subsequent to the shaping and embossing operation by various techniques, including spraying, wiping, and the like.

The material being fed onto the edge of the panel in FIGS. 20–25 may be in the form of a strip or film of thermoplastic material which is continuously fed between the edge to be treated and a heated rotating die. The die softens the thermoplastic material, presses it against the edge and embosses the desired design in the exposed surfaces with suitable adhesives being employed and the strip or film being of sufficient thickness to flow into and fill all irregularities in the surface of the edge thereby eliminating the necessity for precise, close tolerance preforming of the edge.

From the disclosure of the various techniques, in all instances, the plastic hardenable material is fully exposed, is carefully and accurately detailed in profile, surface texture, and color so as to achieve the desired effect of matching and blending with the surface of the panel and is formulated to achieve maximum durability, impact strength and ease of finishing. In addition, the method of first applying the edging of hardenable material to a substrate and then applying a face and a back to form a three-ply panel and finally profiling the edge by a shaping operation produces certain advantages over the molding technique illustrated in FIGS. 1–8. Exposed polyester margins on plastic faces require special care in finishing in order to match the faces and to prevent the finishing material from getting on the faces. While attempts have been made to eliminate such margins on plastic face panels by running the preformed panels with zero tolerance between the preform and the mold, this is difficult to do on a volume basis in view of various factors. For example, thermal expansion of the mold, expansion of the mold caused by absorption of polyester materials and the normal small variations in machining preforms all combine to produce variations in the fit between the mold and the preform which will either cause a small margin on the finished panel or will prevent the preform from being placed into the mold. The laminating technique of applying the face and back to the preform after application of the hardenable material illustrated in FIGS. 9–15 completely eliminates this problem.

The foregoing is condidered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of forming a panel with a decorative integral shaped edge comprising the steps of sequentially;
   a. forming a pheripheral edge on a panel;
   b. applying a continuous edge of hardenable material to said peripheral edge of the panel by positioning the panel within a mold cavity having a shaped inner peripheral surface, spacing at least a portion of the periphery of the panel from the surface of the cavity to define a void space free of interruption, sealing the bottom of the cavity, flowing a flowable and hardenable decorative material into the void space into direct contact with the surface of the cavity and the portion of the periphery of the panel spaced therefrom, allowing the material to harden and become integrated with the panel and removing the mold from the integrated panel and hardened decorative material by separation along the surface of the cavity;
   c. laminating at least one face to said panel with the peripheral edge of each said laminated face projecting peripherally beyond said applied continuous edge; and
   d. final shaping said continuous edge of hardened material and the peripheral edge of each said face.

2. The method, as claimed in claim 1, including the step of profiling said continuous edge of hardenable material before laminating.

3. The method, as claimed in claim 1, including laminating two faces to said panel on opposite sides.

4. The method, as claimed in claim 1, including the additional step of removing excess hardenable material from said panel prior to laminating.

5. The method, as claimed in claim 1, wherein said applied continuous edge of hardenable material is beveled at its peripheral edge.

6. The method, as claimed in claim 1, wherein said final shaping comprises trimming said laminated face and said applied edge to the desired profile and then abrading the resulting profile edge to impart the desired finish to said edge.

7. The method, as claimed in claim 1, wherein said applied continuous edge of hardenable material is a profiled and grained edge.

8. The method, as claimed in claim 7, wherein said final shaping of said applied continuous edge consists of shaping only the portion of said profiled edge adjacent at least one of said laminated faces.

9. The method, as claimed in claim 8, wherein said final shaping consists of shaping only the portions of said profiled edge adjacent each of said laminated faces.

10. The method of forming a panel with a decorative integral edge shaped to a desired profile comprising the steps of:
    a. forming a peripheral edge on a panel;
    b. applying a continuous edge of hardenable material to said peripheral edge of the panel, said continuous edge having a bevel at its peripheral edge, said applying step comprising positioning the panel within a mold cavity having a shaped inner peripheral surface, spacing at least a portion of the periphery of the panel from the surface of the cavity to define a void space free of interruption, sealing the bottom of the cavity, flowing a flowable and hardenable decorative material into the void space into direct contact with the surface of the cavity and the portion of the periphery of the panel spaced therefrom, allowing the material to harden and become integrated with the panel and removing the mold from the integrated panel and hardened decorative material by separation along the surface of the cavity;

c. removing excess hardenable material from said panel;

d. laminating two faces to said panel on opposite sides thereof with the peripheral edge of each said laminated face projecting peripherally beyond said bevel of said applied continuous edge; and e. final shaping said continuous edge of hardened material and the peripheral edges of said laminated faces to the desired profile.

* * * * *